United States Patent [19]

Thomas et al.

[11] Patent Number: 5,433,501
[45] Date of Patent: Jul. 18, 1995

[54] POST CONSTRUCTION AND SIDEWALL FOR CARGO CONTAINER

[75] Inventors: Michael I. Thomas; Richard S. Durke; Charles R. Fetz; Raymond A. McDonald, Jr., all of Savannah, Ga.

[73] Assignee: Great Dane Trailers, Inc., Savannah, Ga.

[21] Appl. No.: 123,735

[22] Filed: Sep. 20, 1993

[51] Int. Cl.⁶ .................. B62D 33/04; B62D 27/02
[52] U.S. Cl. .................. 296/191; 396/181; 396/205; 396/29; 220/1.5; 105/409; 52/731.6
[58] Field of Search ............. 296/29, 181, 183, 205, 296/191; 105/409; 220/1.5; 52/731.2, 731.4–731.6, 730.4, 726.3; D25/124, 126, 119

[56] References Cited

U.S. PATENT DOCUMENTS

| | | | |
|---|---|---|---|
| 2,123,441 | 7/1938 | Schlesinger | 105/409 |
| 2,384,965 | 9/1945 | Reid | 296/181 |
| 2,446,323 | 8/1948 | Davis et al. | |
| 2,579,774 | 12/1951 | Akey | 296/29 X |
| 2,901,283 | 8/1959 | Curell | 296/181 |
| 2,975,874 | 3/1961 | Pagan | 52/731.2 X |
| 3,028,192 | 4/1962 | Jewell | 296/183 |
| 3,126,224 | 3/1964 | Carter, Jr. et al. | 296/181 |
| 3,242,625 | 1/1963 | Tillinghast | 52/161 |
| 3,646,609 | 2/1972 | Bodenheimer | 220/1.5 |
| 3,735,547 | 5/1973 | Moyer et al. | 52/731.2 |
| 3,834,575 | 9/1974 | Carr | 220/1.5 |
| 4,685,721 | 8/1987 | Banerjea | 296/181 |
| 4,810,027 | 3/1989 | Ehrlich | 296/181 |
| 4,944,421 | 7/1990 | Yurgevich | 220/1.5 |
| 5,058,756 | 10/1991 | Green | 296/181 X |
| 5,066,066 | 11/1991 | Yurgevich et al. | 296/181 |
| 5,112,099 | 5/1992 | Yurgevich et al. | 296/181 |
| 5,195,800 | 3/1993 | Stafford et al. | 296/181 |

FOREIGN PATENT DOCUMENTS

| | | | |
|---|---|---|---|
| 1581478 | 9/1969 | France | 220/1.5 |
| 2296066 | 12/1974 | France | 52/582.1 |
| 0118848 | 5/1947 | Sweden | 296/29 |
| 578215 | 6/1946 | United Kingdom | 296/187 |
| 624240 | 5/1949 | United Kingdom | 296/29 |
| 1759712 | 9/1992 | U.S.S.R. | 296/191 |

OTHER PUBLICATIONS

Otto Fastening Systems.
Modern Metals, p. 11, Jan. 1956.

Primary Examiner—Dennis H. Pedder
Attorney, Agent, or Firm—William Squire

[57] ABSTRACT

A container sidewall comprises a plurality of sections each section comprising an extruded aluminum post formed of a tubular rectangular tube having a pair of oppositely extending flanges coplanar with one of the tube broad sides and an aluminum plate riveted to each flange. An identical post interconnects the plates of adjacent sections. A reinforcing hat shaped rib is riveted to each plate midway between posts. The outer wall of the post tube is thicker than the inner wall which is the same thickness as the plates. The tube sides are thinnest to save weight. The plates are relatively thick to preclude damage during normal use. The tube is dimensioned to withstand transverse bending loads and bowing of the sidewalls to preclude damage in a rail car well.

5 Claims, 2 Drawing Sheets

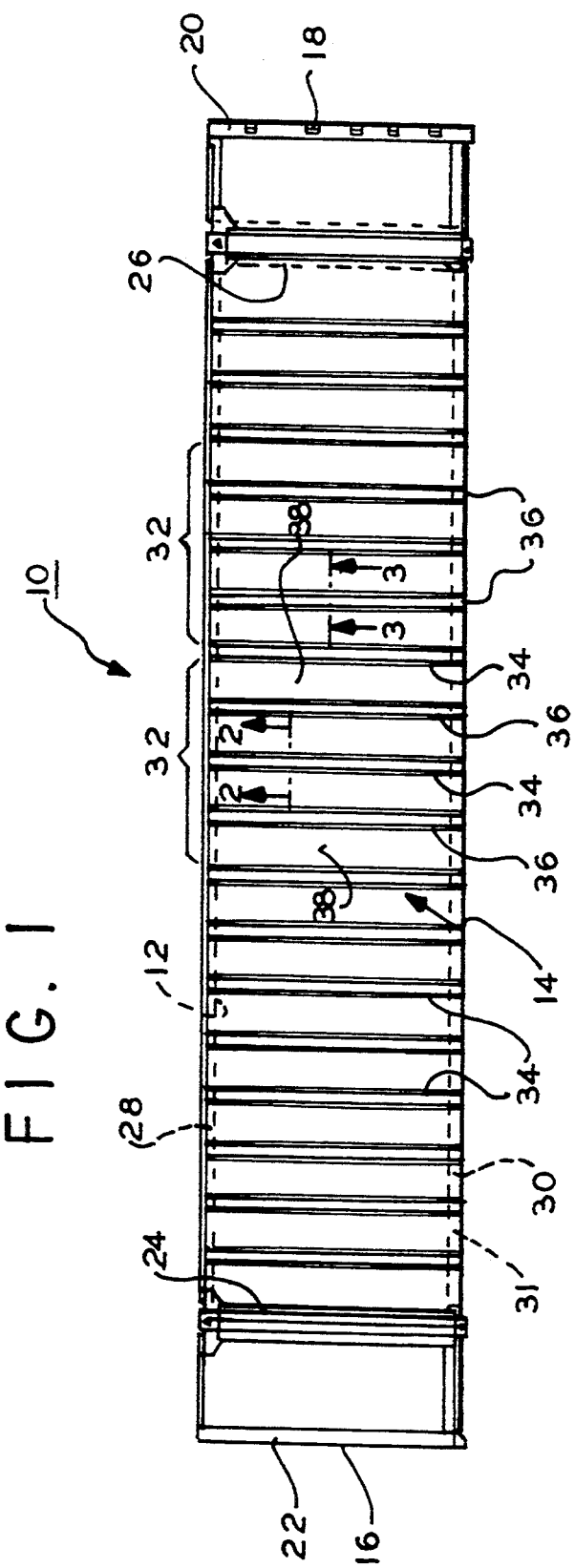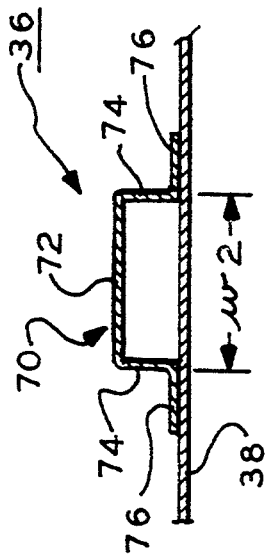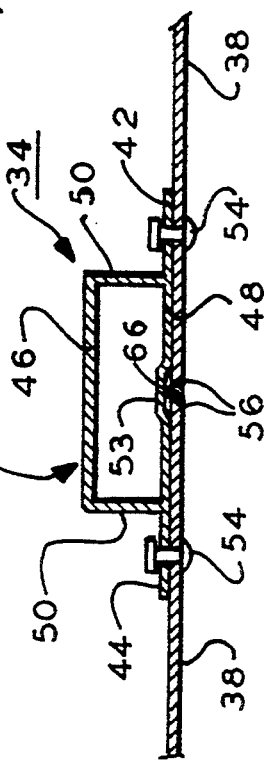

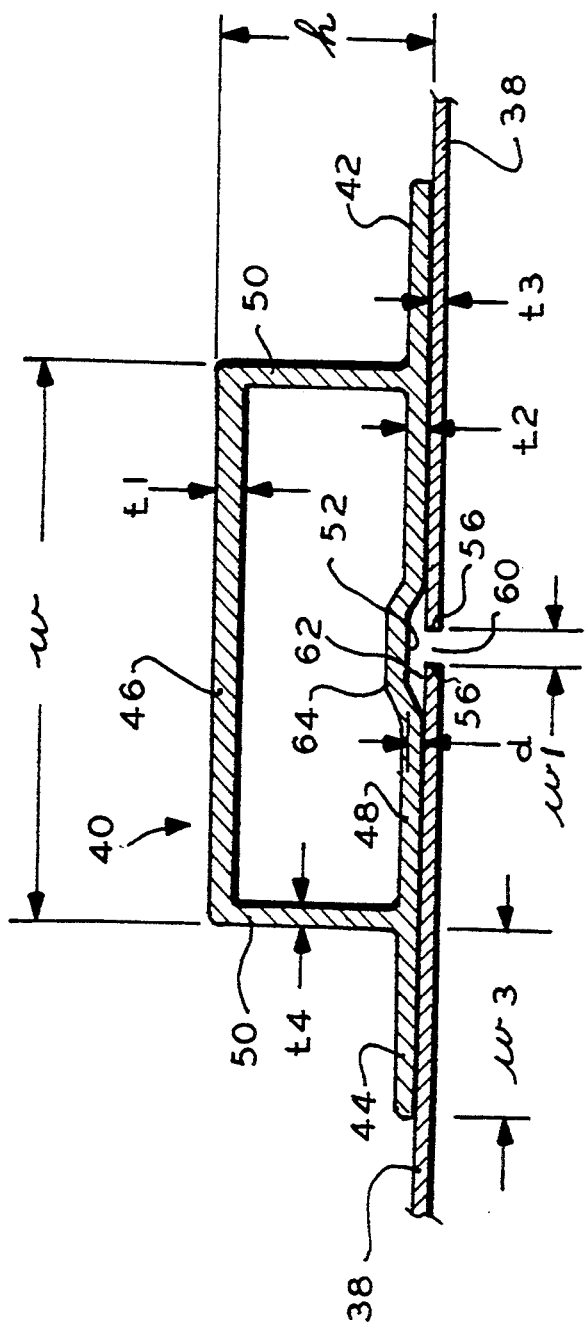

POST CONSTRUCTION AND SIDEWALL FOR CARGO CONTAINER

CROSS REFERENCE

Of interest is commonly owned application Ser. No. 08/055,150 entitled Light Weight Chassis-Container Construction filed Apr. 29, 1993 in the name of Thomas et al.

BACKGROUND OF THE INVENTION

1. Field of the Invention

This invention relates to sidewall structures employed in cargo containers, truck trailers and so on, and more particularly, to a post construction used in such sidewalls.

2. Description of the Prior Art

Cargo containers are used to transport goods by ship, rail and truck. The containers typically are large metal boxes with doors at one end. On ships and rail cars the containers are stacked one over the other. To transport the containers to terminals requires the containers to be placed on a trailer chassis from either the ship or rail car and hauled by truck tractor to a point of destination.

The containers of the prior art are generally similar in construction. Some containers comprise relatively thick steel sheet metal for withstanding stacking loads. These are relatively heavy and utilize large amounts of metal making them costly. Other more widely used containers comprise roof and floor frames wherein the roof frame is supported by a pair of upright intermediate frames on each side. See for example, U.S. Pat. No. 3,646,609 ('609). A relatively thinner sidewall construction is then connected to and between the intermediate frames. Corner posts support the roof frame at each corner and short sections of sidewall are connected between each intermediate frame and a corner post. The intermediate frames have metal castings or fittings at the lower and upper ends. The upper castings or fittings are adapted to receive crane lifting jaws and male alignment members for aligning an upper container stacked thereon.

The lower castings or fittings mate with the upper ones of a lower stacked container or support members such as at the bottom of a rail car well receiving the lower container. The intermediate frame members support the load of an upper stacked container. See for example the aforementioned copending application. The side panels forming the sidewall in an all metal construction comprise relatively thin sheets, e.g., 0.025–0.50 inch (0.635–127 mm) thick aluminum. These are fastened in overlapping relation by rivets or in abutting edge relation as shown for example in U.S. Pat. No. 4,685,721 wherein the edge portions of the side sheet plates are riveted to a securing panel. A sealant is disclosed between the securing panel and the sheet plates at the rivets. Periodically horizontally spaced hat shaped reinforcing ribs vertically oriented between the floor and roof frames are riveted to the sidewall panels. See U.S. Pat. No. 3,646,609 for example. U.S. Pat. No. 2,384,965 shows corrugated sheets in the alternative to the hat shaped ribs.

Other insulating containers have thick insulating walls sandwiched between thin outer metal sheets which are also fastened to the intermediate frames. Plywood sheets are typically fastened to the interior surface of the side panels of the container or to spacer ribs in the interior. The plywood sheets protect the side panels from damage caused by the cargo during transport or during load and unload, the panels being relatively thin and thus damage relatively easily exhibiting dents or even punctures. See U.S. Pat. No. 2,384,965 for interior linings in a vehicle body construction in truck trailers. Truck trailers are constructed similarly but without the intermediate frames utilized in the container configuration.

A further problem occurs when containers are transported in rail cars. These cars have wells which closely receive the containers. The side panels, in all metal configurations, however, due to cargo transverse loading, as recognized by the present inventors, bow outwardly near their floors. This bowing causes the side panels to interfere with the rail car sides forming the well and damages the side panels during loading or unloading of the containers from the rail car and also during transport. This damage can require premature replacement of the container.

The use of additional plywood which needs to be periodically replaced due to damage and the damaging of the metal side panel sheets is costly as well as the cause of unsightly damage. The present inventors recognize a need to provide an improved cargo container and the like which is less likely to damage in use and is less costly then prior art structures.

SUMMARY OF THE INVENTION

A post construction for use with a cargo container, trailer and the like which may include corner upright supports and intermediate upright supports, a sidewall construction according to one aspect of the present invention wherein the sidewall is formed of a linearly aligned array of interconnected sections connected between the corner or upright supports, each section comprising two plate members secured to opposing sides of a post, the sidewall comprising a plurality of sections wherein each section is secured to a next adjacent section by a post. The post comprises a first hollow elongated tubular member comprising a plurality of parallel opposing planar sides each having opposing longitudinal edges, each longitudinal edge being integral with an edge of a next adjacent side to form an integral moisture impervious tube along the tube length. The opposing sides of the member are spaced from each other an amount sufficient such that the tube substantially withstands transverse bending loads imposed thereagainst by the cargo. The tubular member is adapted to be located in a plurality of spaced positions along the sidewall between the corners or intermediate supports.

First and second flanges are secured to the tube on opposite sides thereof, each flange including means adapted to be secured to a different plate member to form a section with the post.

In accordance with one embodiment of the present invention, first and second coplanar plate members are included which form a section with the tubular member. Each plate member is secured to a different flange in spaced edge relation to each other and includes means for securing an edge region thereof distal the first tubular member to a further tubular member flange.

In accordance with a further embodiment, the one side has a channel therein external the hollow core of the tubular member extending along the member for the length of the member adjacent to the facing plate member edges. A sealant is in the channel and the space between the facing plate member edges.

Preferably the post and flanges are extruded aluminum with the post sides of different thicknesses.

IN THE DRAWING

FIG. 1 is a side elevation view of a cargo container according to an embodiment of the present invention;

FIG. 2 is a sectional view of the container of FIG. 1 taken along lines 2—2;

FIG. 3 is a sectional view of the container of FIG. 1 taken along lines 3—3; and FIG. 4 is a more detailed view of container of FIG. 1 similar to the view of FIG. 2 useful for showing the relative dimensions of the post according to one embodiment of the present invention.

DESCRIPTION OF THE PREFERRED EMBODIMENT

In FIG. 1, a container 10 for receiving cargo in the interior thereof is used to transport the cargo by ship, rail and overland by truck. The container preferably is of the type as described in more detail in the aforementioned copending application mentioned in the introductory portion. The container 10 comprises a floor 30, a ceiling 12, a pair of opposing sidewalls 14 (only one being shown), a front wall 16 and a rear wall 18 to which a pair of doors (not shown) are secured to provide access to the container interior. See for example the '609 patent incorporated by reference herein.

The container has a frame as generally shown in the '609 patent and preferably as described in the copending application mentioned above. At the rear are a pair of rear corner upright support posts 20 and at the front are a pair of front upright support corner posts 22. A pair of intermediate upright support frames 24 and 26 are on each side of the container. A sidewall 14 is connected to and between the frames 24 and 26, the ceiling 12 side frame 28 and floor 30 side frame 31 on each of the container sides. In the alternative, the sidewall could be connected directly between the corner posts where intermediate frames are not employed, such as in truck trailer bodies, the intermediate frames being used primarily in stacking containers.

Each sidewall 14 comprises a plurality of sections 32 each interconnected by a post 34. The sections 32 are identical as are posts 34. Each section 32 comprises a central post 34, a pair of panels 38 of identical dimension on opposite post sides and a pair of preferably hat shaped reinforcing ribs 36 riveted to the panels 38, a rib being secured to each panel. One panel is riveted to and between two adjacent posts 34 with a reinforcing rib located centrally of that panel, the ribs and posts being parallel and vertical (from the top to the bottom of the figure). The posts 34 alternate with the ribs 36 from left to right on the sidewall along the length of the container from front to rear.

In FIG. 2, a representative post 34 comprises an extruded tubular member 40, preferably rectangular in transverse section and preferably aluminum. Coextruded with the member 40 are a pair of flanges 42 and 44. The member 40 comprises a front wall 46, a rear wall 48 and two identical side walls 50. The walls 46 and 48 and flanges 42 and 44 are preferably parallel. The flanges 42 and 44 further are coplanar with the rear wall 48 and of the same thickness. Wall 46 is thicker than wall 48 both of which are thicker than sides 50. A central region of wall 48 has a rib 53 along the length of the member 40, rib 53 forming a channel 52 (FIG. 4) external the hollow core of the member 40. The channel 52 extends for the length of the member 40 and is formed therewith during the extrusion process.

The side panels 38 comprise sheet aluminum preferably the same thickness t2 (FIG. 4) as wall 48 and flanges 42 and 44. The panels extend for the length of the post 34. Each panel 38 is riveted to a corresponding flange by rivets 54. The edges 56 of each panel 38 face one another in a plane in spaced relation forming a gap 60, FIG. 4, having a width w1. The panels 38 facing edge regions at gap 60 overlap channel 52 forming a T-shaped recess 62 having a depth d between the panels and the portion 64 of wall 48 forming the channel. In FIG. 2, a sealant 66 is in the T-shaped recess of channel 52 and the panels 38 and is in the gap 60 to seal the panels 38 to each other and to the member 40 in this region. Sealant 66 may be any commercially available material suitable for this purpose, for example a sealant tape.

The relative dimensions of the member 40 and the panels 38 are significant. The wall 46, FIG. 4, is preferably thicker than wall 48 and may in one embodiment be 0.150 inch (3.8 mm) thick, dimension t1. Walls 46 and 48 may each have a width w preferably of about 3 inches (7.6 cm). The wall 48 preferably has a thickness t2 less than t1 and is preferably 0.110 inches (2.8 mm) in this embodiment. The channel 52 preferably has a depth of about 0.09-0.10 inches (2.3-2.5 mm) and is not critical. The sides 50 preferably have a height h of about 1.125 inches (28.6 mm) and the same thickness t4 of about 0.09 inches (2.3 mm) in this embodiment which is less than that of walls 46, 48 and flanges 42 and 44. As mentioned above the panels 38 also are preferably the same thickness as wall 48 and flanges 44 and 46, or about 0.110 inches (2.8 mm), the panels being sheet aluminum. The panels 38 preferably are about 48 inches (1.22 meters) wide and about 112 inches (2.85 meters) in length. The flanges 44 and 46 may have a width w3 of about 1 inch (25.4 mm). The channel 52 depth d may be about 0.09 to 0.10 inches (2.3-2.5 mm) and the gap w1 may be about 0.2-0.3 inches (5.1-7.6 mm) in this embodiment.

A post 34 comprising member 40 is riveted at its flanges 44 and 46 adjacent to an edge 56 of each panel 38 forming a section 32 such that each section 32 is connected to an adjacent section 32 by a further post 36 intermediate adjacent sections 32. Thus the posts 34 and 36 are in this embodiment spaced in equal increments along the sidewall 14 in a linear array.

Reinforcing ribs 36 are identical and a representative rib 36 is shown in FIG. 3 wherein the rib 36 comprises a channel member 70 having a base wall 72 and two sidewalls 74. A pair of identical flanges 76 extend outwardly from the sidewalls at an edge thereof as shown. The flanges are riveted to the panel 38 by rivets not shown. The ribs 36 may be conventional wherein sidewalls 74 have a height the same as height h of the post 34 member 40, a thickness the same as sides 50 of member 40 and a width w2 the same as member 40 width w1.

In FIG. 4, wall 46 is thicker than wall 48 in order to withstand damaging forces from an external environment as the wall 46 is external the container sidewall. The wall 46 is thus subject to normal abuse as occurs in transporting the container and during load and unload operations in addition to exposure to impacts as typically occur from external sources. The wall 48 is thinner than wall 46 because wall 48 is not exposed to damaging forces in the same context as wall 46, the wall 48 being substantially protected by plates 38. Also rib 53 reinforces wall 48 which adds to this wall's strength.

Sides 50 of member 40 can be thinner than walls 46 and 48 because they are not readily subject to damaging impacts as these other walls. The thinner construction saves weight and material which is important because overland trucks are limited in their weight by various local state laws. The more weight saved in the container the greater its cargo capacity for a given weight limit. The sides 50 form the tubular configuration which is relatively rigid and strong. The relative size of the member 40 in cross section is dimensioned to withstand transverse loads, i.e., normal to walls 46 and 48, caused by cargos carried by the container which cargos abut the interior of the container and impose impact forces against the member 40 in an outward direction, i.e., toward the top of the drawing FIG. 2. This precludes the outward bowing of the container near its floor as occurs in prior art containers without the posts 34. The post 34 therefore is much more rigid than prior are constructions in this direction.

While the intermediate posts appear similar to post 34 in that they may be tubular in configuration, the intermediate posts are provided to support a vertical load and are used in key locations much fewer in number than posts 34 for a different purpose. For example, the container 10 of FIG. 1 also uses the intermediate posts 24 and 26. But these do not alleviate the problems with the relatively large sidewalls as discussed herein. Also, posts 24 and 26 are significantly stronger and larger in transverse dimension than that required for sidewall posts of the kind described herein. Similarly, the front and rear corner posts 20 and 22 may also be tubular but these also are of different dimensions than the posts 34 and serve a different purpose than the posts 34. The purpose of posts 34 is not to support a vertical load as the corner and intermediate posts, but in contrast, withstand large transverse cargo loads along the length of the sidewall 14 to preclude outward sidewall bowing while minimizing weight. The use of posts such as posts 34 for sidewall purposes as described herein are not known.

The use of an extrusion to form the member 40 is also important because it provides relatively lower cost in manufacturing considering the relatively large number of posts 34 used in a sidewall. Further the panels 38 are in spaced edge relation as compared to overlapping riveted or abutting relation as in the prior art. This relation permits efficient sealing of the panels 38 to the posts 34. The channel 52 provides the recess 63 which permits sealant to be inserted between the post wall 48 and the panels 38 to improve sealing efficiency as well as in the gap 60 between panel the edges 56. The sealant that is inserted in the gap 60 and recess 62 may be for example ½ inch (12.7 mm) wide by 3/16 inch thick (4.8 mm) tape. The tape is forced into the recess 62 to provide the sealant action.

The panels being preferably about 0.110 inches (2.8 mm) thick are typically thicker than prior art panels and therefore provide increased resistance to damage caused by cargo loads in the container. Thus, the use of plywood liners is not necessary, eliminating their weight and also their cost in both initial installation and for replacement as well as avoiding the unsightly damage that occurs to plywood during use. Thus the sidewall construction of the present invention is more efficient in use, subject to less damage than prior art sidewalls and avoids the need of replacement and repair, providing a longer life container.

While in certain prior art sidewalls, plates of about 0.125–0.160 inch (3.2–4.1 mm) thickness may be used, they are attached in overlapping relation and the plate interconnections are only about ⅜ inches (9.5 mm) thick and thus do not provide protection against bowing due to transverse cargo loads. Typically prior sidewalls use 0.050 inch (1.3 mm) thick sheets which are more vulnerable to damage and bowing and frequently are punctured. Thus, these are costly to maintain.

While containers have been illustrated herein, it should be understood that similar construction as described herein may be used in truck trailer bodies and other similar cargo receiving structures.

It should be understood that the description herein is given by way of example and not by way of limitation and that modifications may be made to the described structures by one of ordinary skill. The scope of the invention described herein is as defined in the appended claims.

What is claimed is:

1. In a sidewall construction for use in a container, trailer and the like, said container, trailer and the like for use in carrying cargo in transportation systems and comprising a sidewall connected to a plurality of other walls including a front and rear wall, said sidewall construction being formed of an array of sections, each said section comprising:

a first hollow core tubular member comprising an elongated one piece integral homogeneous tube formed by a plurality of substantially planar sides, one of said sides having a portion protruding into the core forming a depression extending for substantially the length of the tubular member;

first and second coplanar flanges secured to said tube substantially coplanar with said one of said sides and substantially along the length thereof and on opposite sides thereof to form a post therewith:

a first plate member secured to one of said flanges extending along the length of that flange and a second plate member secured to the other of said flanges extending along the length of the other flange, said plate members being coplanar and juxtaposed at a first edge region over the depression to form a cavity with the depression; and means for securing a further tubular member to the edge regions of each said first and second plate members distal said first tubular member;

the first and second plate member being in spaced facing edge relation at the first edge region and further including a sealant between said plate members at the edge regions thereof and said tubular member in said cavity.

2. The sidewall construction of claim 1 wherein each said tubular member includes first and second spaced opposite sides having at least a first thickness, each said tubular member having third and fourth spaced opposite sides normal to and connected to the first and second sides, said third and fourth sides having a second thickness less than the first thickness, said first and second sides being spaced an amount sufficient to preclude substantial transverse bending in response to a cargo load bearing thereagainst.

3. The sidewall construction of claim 2 wherein the first side has a thickness less than that of the second side, the flanges being substantially coplanar with the first side, the third and fourth sides having a third thickness less than that of said first side.

4. The sidewall construction of claim 3 wherein the plate members have the approximately the same thickness as the first side.

5. The sidewall construction of claim 1 including a plurality of sections interconnected by a further tubular member and arranged to form a given sidewall.

* * * * *